(12) United States Patent
Leeson et al.

(10) Patent No.: US 12,372,735 B2
(45) Date of Patent: Jul. 29, 2025

(54) ASSEMBLIES FOR PULLING, PUSHING, OR BLOWING A PLURALITY OF PRETERMINATED FIBER OPTIC CABLES THROUGH A DUCT AND ASSEMBLING A FIBER OPTIC CONNECTOR INCLUDING THE PRETERMINATED FIBER OPTIC CABLE AFTER BEING PULLED, PUSHED, OR BLOWN THROUGH THE DUCT

(71) Applicant: PPC BROADBAND, INC., East Syracuse, NY (US)

(72) Inventors: Kim Leeson, Ipswich (GB); Shaun Trezise, Aldeburgh (GB)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 18/753,967

(22) Filed: Jun. 25, 2024

(65) Prior Publication Data

US 2024/0345356 A1    Oct. 17, 2024

Related U.S. Application Data

(63) Continuation of application No. 17/751,657, filed on May 23, 2022, now Pat. No. 12,019,302.
(Continued)

(51) Int. Cl.
*G02B 6/50* (2006.01)
*G02B 6/44* (2006.01)
(Continued)

(52) U.S. Cl.
CPC ............... *G02B 6/50* (2013.01); *G02B 6/441* (2013.01); *G02B 6/475* (2023.05); *G02B 6/545* (2023.05)

(58) Field of Classification Search
CPC .......... G02B 6/50; G02B 6/475; G02B 6/545; G02B 6/4463; G02B 6/4465; G02B 6/4466
See application file for complete search history.

(56) References Cited

U.S. PATENT DOCUMENTS

| 4,684,161 A | 8/1987 | Egner et al. |
|---|---|---|
| 4,684,211 A | 8/1987 | Weber et al. |

(Continued)

FOREIGN PATENT DOCUMENTS

| EP | 2431776 A1 | 3/2012 |
|---|---|---|
| GB | 2485070 A | 5/2012 |

OTHER PUBLICATIONS

Search Report dated Apr. 18, 2013 in corresponding UK Application No. 1300214.2, 34 pages.
(Continued)

*Primary Examiner* — Ryan A Lepisto
*Assistant Examiner* — Erin D Chiem
(74) *Attorney, Agent, or Firm* — MH2 TECHNOLOGY LAW GROUP LLP (57) ABSTRACT

An assembly for pulling, pushing, or blowing a plurality of preterminated fiber optic cables of a multi fiber cable through a duct includes a sleeve, a rod configured to be coupled with the sleeve, and a plurality of dust caps. The sleeve is configured to receive to be coupled with a multi fiber cable and to permit a plurality of preterminated fiber optic cables of the multi fiber cable to pass through the sleeve, and the rod includes a first end configured to be coupled with the sleeve. Each of the plurality of dust caps is configured to be coupled with a ferrule of one of the preterminated fiber optic cables, and each of the plurality of dust caps is configured to be coupled with the rod, thereby coupling the preterminated fiber optic cables with the rod. The preterminated fiber optic cables are configured to be
(Continued)

assembled with a fiber optic connector, the deployment assembly has a cross-sectional footprint that is smaller than a cross-sectional footprint of a fiber optic connector that is configured to be assembled with the preterminated fiber optic cable, and the plurality of preterminated fiber optic cables are configured to be pushed, pulled, or blown together through a duct having an inner diameter than is less than a cross-sectional footprint of a fiber optic connector that is configured to be assembled with the preterminated fiber optic cable.

22 Claims, 13 Drawing Sheets

Related U.S. Application Data (60) Provisional application No. 63/191,549, filed on May 21, 2021.

(51) Int. Cl.
  *G02B 6/46* (2006.01)
  *G02B 6/54* (2006.01)

(56) References Cited

U.S. PATENT DOCUMENTS

| | | | |
|---|---|---|---|
| 5,863,083 A | 1/1999 | Giebel et al. | |
| 5,923,804 A | 7/1999 | Rosson | |
| 6,104,855 A | 8/2000 | Jeon | |
| 6,234,683 B1 | 5/2001 | Waldron et al. | |
| 6,389,214 B1 | 5/2002 | Smith et al. | |
| 7,136,555 B2* | 11/2006 | Theuerkorn | G02B 6/4461 385/100 |
| 7,397,992 B1* | 7/2008 | Blazer | G02B 6/4433 385/106 |
| 7,542,651 B2* | 6/2009 | Lewallen | G02B 6/4475 385/139 |
| 7,565,055 B2 | 7/2009 | Lu et al. | |
| 8,285,096 B2 | 10/2012 | Coleman et al. | |
| 8,292,517 B2* | 10/2012 | Allen | G02B 6/4431 385/100 |
| 8,412,017 B2 | 4/2013 | Kowalczyk et al. | |
| 8,620,129 B2 | 12/2013 | Rudenick et al. | |
| 8,630,523 B2 | 1/2014 | Smith et al. | |
| 8,718,425 B2 | 5/2014 | Piña et al. | |
| 9,057,862 B2 | 6/2015 | Strasser et al. | |
| 9,146,374 B2 | 9/2015 | Ott | |
| 9,164,233 B2 | 10/2015 | Wouters | |
| 9,285,559 B1 | 3/2016 | Stockton et al. | |
| 9,297,976 B2 | 3/2016 | Hill et al. | |
| 9,753,234 B2 | 9/2017 | Stockton et al. | |
| 2005/0111799 A1* | 5/2005 | Cooke | G02B 6/4472 385/100 |
| 2005/0129375 A1* | 6/2005 | Elkins, II | G02B 6/4472 385/100 |
| 2006/0056782 A1 | 3/2006 | Elkins, II et al. | |
| 2006/0120672 A1* | 6/2006 | Cody | G02B 6/44528 385/86 |
| 2006/0153517 A1* | 7/2006 | Reagan | G02B 6/44528 385/135 |
| 2008/0226234 A1 | 9/2008 | Droege | |
| 2009/0238523 A1 | 9/2009 | Honma et al. | |
| 2009/0238534 A1 | 9/2009 | Ahmed | |
| 2010/0051886 A1 | 3/2010 | Cooke et al. | |
| 2010/0202748 A1 | 8/2010 | Pierce et al. | |
| 2016/0124173 A1 | 5/2016 | Kowalczyk et al. | |
| 2017/0261716 A1 | 9/2017 | Thompson et al. | |
| 2017/0285275 A1 | 10/2017 | Hill et al. | |
| 2019/0101702 A1 | 4/2019 | Li et al. | |
| 2020/0124805 A1 | 4/2020 | Rosson et al. | |
| 2021/0141169 A1 | 5/2021 | Leeson et al. | |
| 2022/0163747 A1 | 5/2022 | Cooke et al. | |

OTHER PUBLICATIONS

International Search Report and Written Opinion dated Sep. 8, 2022 in corresponding International Application No. PCT/US2022/030610, 11 pages.

* cited by examiner

ASSEMBLIES FOR PULLING, PUSHING, OR BLOWING A PLURALITY OF PRETERMINATED FIBER OPTIC CABLES THROUGH A DUCT AND ASSEMBLING A FIBER OPTIC CONNECTOR INCLUDING THE PRETERMINATED FIBER OPTIC CABLE AFTER BEING PULLED, PUSHED, OR BLOWN THROUGH THE DUCT

CROSS REFERENCE TO RELATED APPLICATIONS

This application is a continuation of U.S. Nonprovisional application Ser. No. 17/751,657, filed May 23, 2022, pending, which claims the benefit of U.S. Provisional Application No. 63/191,549, filed May 21, 2021, the disclosures of which is hereby incorporated by reference herein in their entirety.

BACKGROUND

The present disclosure relates to preterminated multi-fiber drop cables, for example, multi-fiber drop cables having fibers terminated with an LC (Lucent Connector) connector sub-assembly. More particularly, the disclosure relates to preterminated LC quattro, LC duo, or other LC multi fiber drop cables and methods for deploying the preterminated LC quattro, LC due, or other LC multi fiber drop cables.

The mechanical tolerances involved in terminating single mode optical fiber are much tighter than those for multimode optical fiber. Therefore, while it is quite common for multimode optical fiber to be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector that is configured to be connected with an outer housing after the pre-terminated end is deployed to its desired location. The pre-terminated end and housing is then ready to plug into a matching receptacle.

One example of such a connector is an LC connector. The LC connector and adapters were originally developed by Lucent Technologies. The LC connector is a miniaturized version of the fiber optic SC (Subscriber Connector) connector, thus being also known as a small form factor connector. The LC connector looks somewhat similar to the SC connector but is about half the size with a 1.25 mm ferrule instead of a 2.5 mm ferrule. LC connectors are typically composed of a plastic housing with an RJ45 push-pull style clip.

Conventional optical fiber LC connectors comprise a rigid pushable structure to allow for limited movement of the connector parts while being pushed down stretches of a duct. However, some conventional fiber optic cables include more than one fiber. For example, some fiber optic cables include two, four, or more fibers.

Conventional optical fiber LC connectors and LC connector sub-assemblies are not necessarily designed to minimize a cross-sectional footprint and, therefore, it is difficult to push multiple preterminated fibers of a multi-fiber cable through a duct simultaneously.

Therefore, it may be desirable to provide a deployment assembly for preterminated multi-fiber drop cables having a minimal cross-sectional footprint so that the multiple fibers can be easily and smoothly pushed, pulled, or blown through a duct. It may be desirable to provide an LC connector that is field installable on a fiber optic cable preterminated with an LC sub-assembly after the preterminated fiber optic cable is pushed, pulled, or blown through the duct.

It may be desirable to provide a deployment assembly configured to be coupled with a plurality of preterminated fiber optic cables and to provide a cross-sectional footprint that is smaller than a cross-sectional footprint of a fiber optic connector that is configured to be assembled with the preterminated fiber optic cable such that the plurality of fiber optic cables can be easily and smoothly pushed, pulled, or blown together through a duct having an inner diameter than is less than a footprint the fiber optic connector. It may be desirable to provide a fiber optic connector configured to be field assembled with the plurality of preterminated fiber optic cables after the plurality of fiber optic cables are pushed, pulled, or blown together through a duct and the deployment assembly is removed from the plurality of preterminated fiber optic cables.

SUMMARY

In accordance with various aspects of the disclosure, assembly for pulling, pushing, or blowing a plurality of preterminated fiber optic cables of a multi fiber cable through a duct includes a sleeve, a rod configured to be coupled with the sleeve, and a plurality of dust caps. The sleeve is configured to receive to be coupled with a multi fiber cable and to permit a plurality of preterminated fiber optic cables of the multi fiber cable to pass through the sleeve, and the rod includes a first end configured to be coupled with the sleeve. Each of the plurality of dust caps is configured to be coupled with a ferrule of one of the preterminated fiber optic cables, and each of the plurality of dust caps is configured to be coupled with the rod, thereby coupling the preterminated fiber optic cables with the rod. The preterminated fiber optic cables are configured to be assembled with a fiber optic connector, the deployment assembly has a cross-sectional footprint that is smaller than a cross-sectional footprint of a fiber optic connector that is configured to be assembled with the preterminated fiber optic cable, and the plurality of preterminated fiber optic cables are configured to be pushed, pulled, or blown together through a duct having an inner diameter than is less than a cross-sectional footprint of a fiber optic connector that is configured to be assembled with the preterminated fiber optic cable.

According to various aspects, the assembly further includes a protective sleeve configured to surround the sleeve, the ferrule assemblies of the preterminated fiber optic cables, and/or the dust caps. In some aspects, the protective sleeve is a Polytetrafluoroethylene (PTFE) protective sleeve.

In accordance with some aspects of the disclosure a method of deploying preterminated fiber optic cables to a desired location includes providing the aforementioned deployment assembly, feeding the preterminated ends of the fiber optic cables of the multi fiber cable through the sleeve, sliding the sleeve over an end of the multi fiber cable, crimping an inner sleeve portion of the sleeve onto the end of the multi fiber cable, inserting the second end of the rod into an outer sleeve portion of the sleeve, potting the fiber optic cables and the rod in the outer sleeve portion of the sleeve, with the dust caps on the ferrules, coupling the attachment structures of the dust caps to the rod, and pushing, pulling, and/or blowing the rod with the attached preterminated fiber optic cables through a duct.

BRIEF DESCRIPTION OF THE DRAWINGS

Embodiments of the invention will now be further described, by way of example only, and with reference to the accompanying drawings, in which.

DETAILED DESCRIPTION OF EMBODIMENTS

FIGS. 1-4 illustrate an exemplary deployment assembly 100 for pushing, pulling, and/or blowing multiple preterminated fiber optic cables of a multi fiber cable 102 through a duct. In the illustrated embodiment, the multi fiber cable 102 includes four fiber optic cables 104. Of course, in various embodiments, the multi fiber cable 102 may include more or less than four fiber optic cables. Each of the four fiber optic cables 104 is terminated with a ferrule assembly 150, for example, an LC ferrule assembly. Thus, in such an embodiment, the preterminated multi fiber cable 102 may be referred to as an LC quattro.

Figure 5:
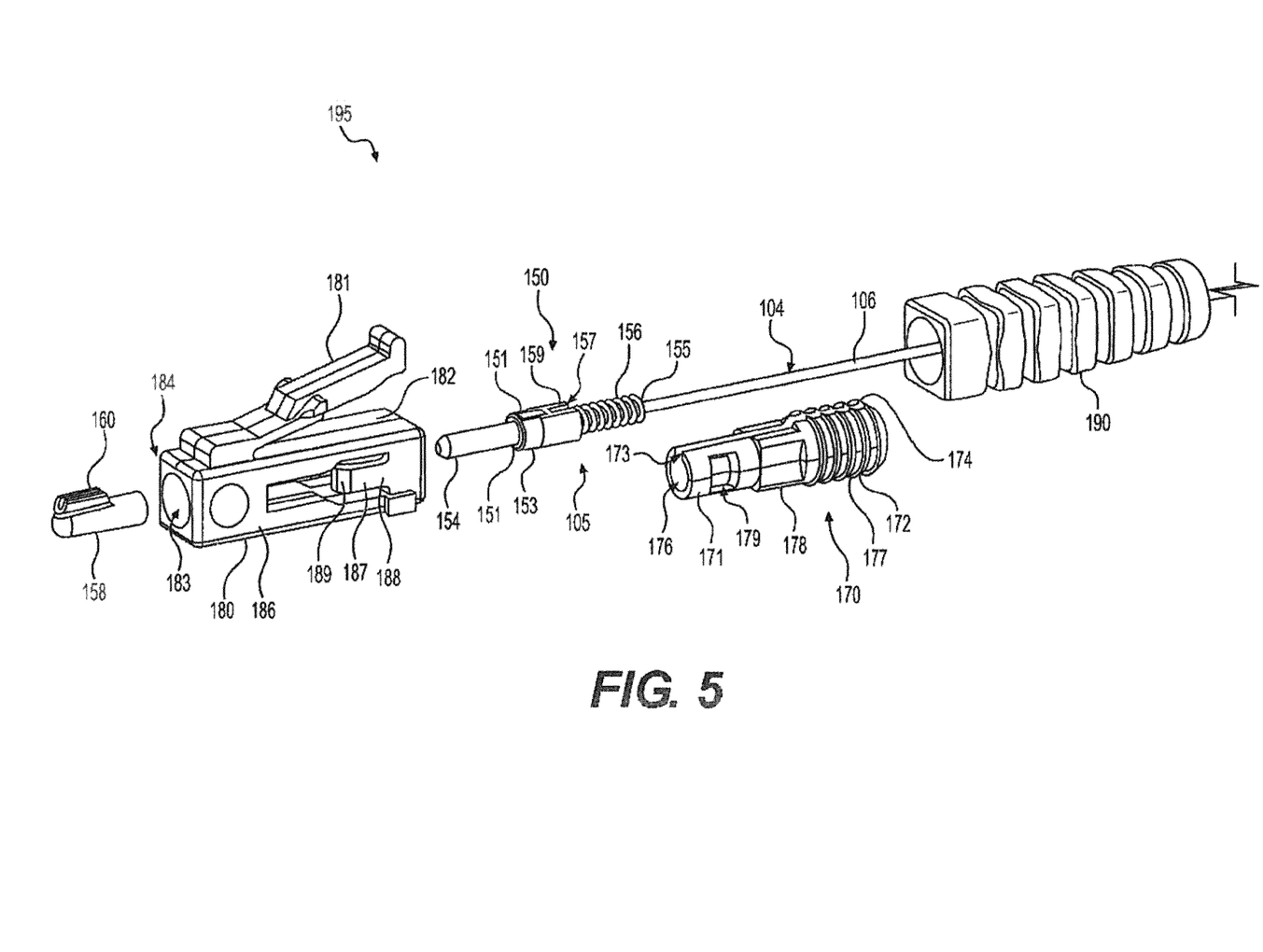
FIG. 5 is an exploded perspective view of an exemplary field assembled fiber optic connector in accordance with various aspects of the disclosure.
Figure 6:
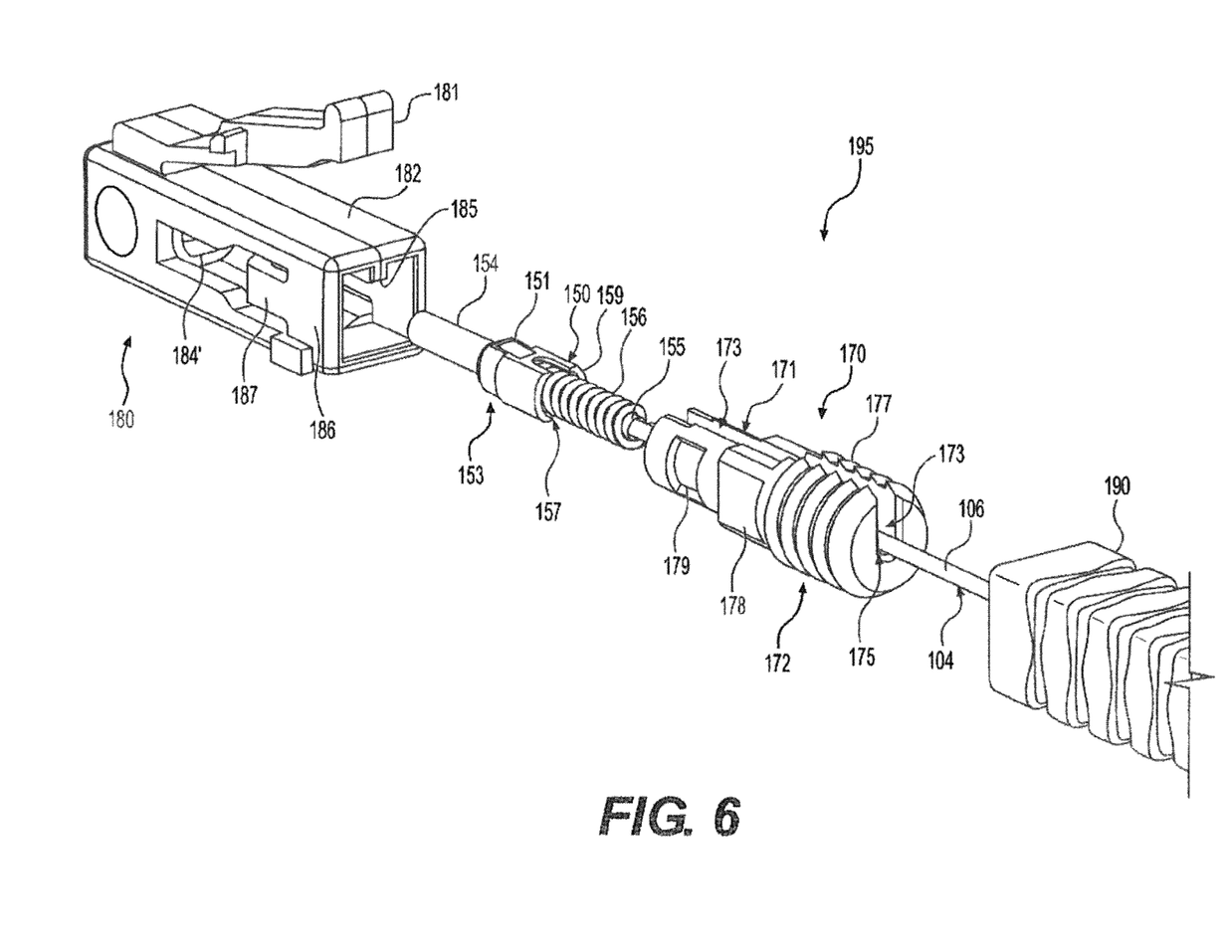
FIG. 6 is a perspective view of the exemplary field assembled fiber optic connector of FIG. 5 during assembly.
Figure 10:
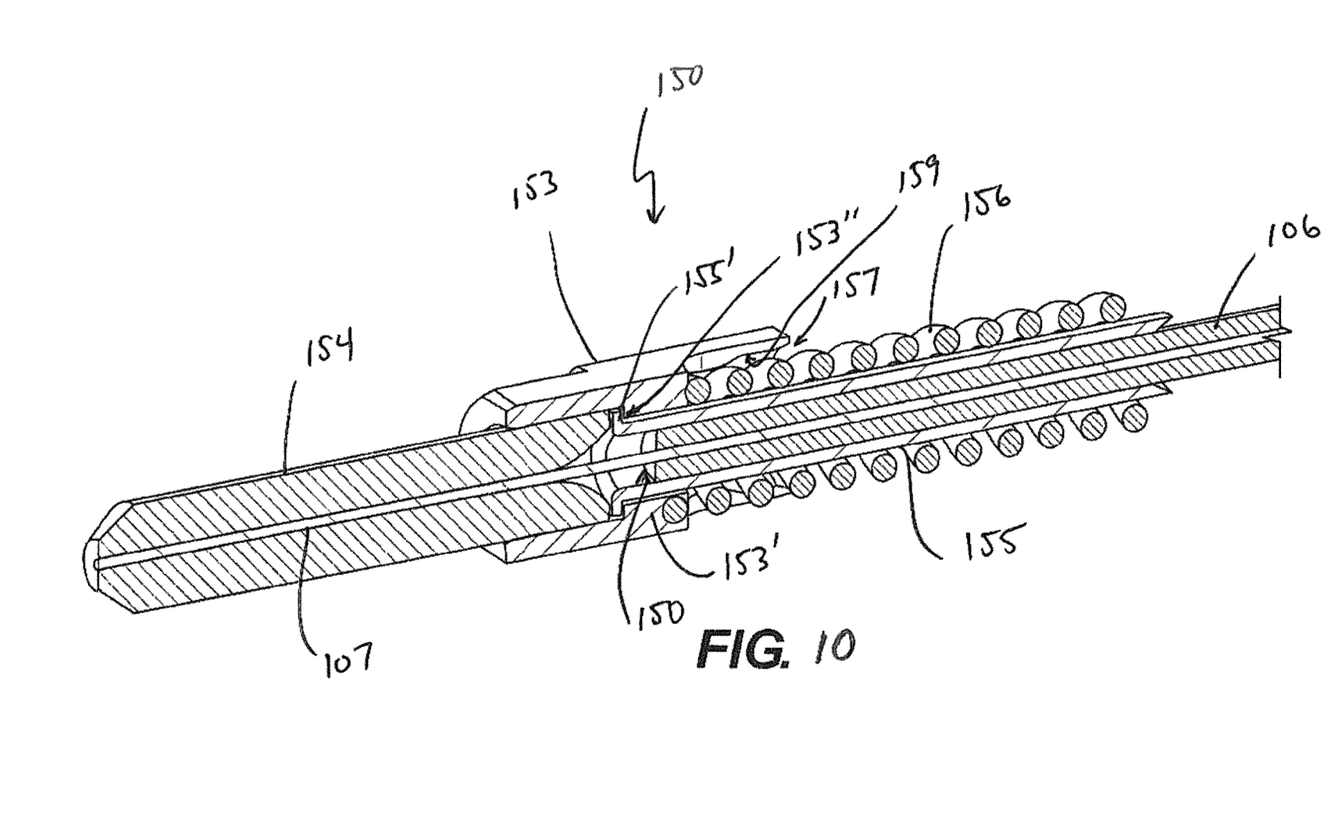
FIG. 10 is a cross-sectional view of the ferrule assembly of the deployment assembly for a multi fiber cable of FIG. 1 and the field assembled fiber optic connector of FIG. 5.

As best shown in FIGS. 5, 6, and 10, the ferrule assembly 150 includes a ferrule holder 152 having an outer sleeve portion 153 and an inner sleeve portion 155. Referring to FIG. 10, the inner sleeve portion 155 is configured to be received in the outer sleeve portion 153. The inner sleeve portion 155 includes a flanged portion 155' at its forward end, and the outer sleeve portion 153 includes a stepped portion 153' configured to define a shoulder having a forward facing surface 153". The inner sleeve portion 155 is configured to be received in a forward end of the outer sleeve portion 153 and can be slid axially through the outer sleeve portion 153 to a position where the flanged portion 155' engages the stepped portion 153'.

A ferrule 154 is configured to be seated in an outer sleeve portion of the outer sleeve portion 153 of the ferrule holder 152 forward of the flanged portion 155' of the inner sleeve portion. A spring 156 is configured to be seated in an annular channel 157 at rear portion of the outer sleeve portion 153 between an inner wall 159 of the outer sleeve portion 153 of the ferrule holder 152 and an outer wall of the inner sleeve portion, as best shown in FIG. 10. An outer surface of the ferrule holder 152 includes two flatted regions 151 on opposite sides of the ferrule holder 152. The ferrule 154 may be a cylindrical ceramic ferrule. The ferrule assembly 150 preterminates an end 105 of a fiber optic cable 104, which includes a buffer tube 106 that surrounds and protects a fiber 107. A dust cap 158 is configured to be received over and cover the ferrule 154 to protect the ferrule 154 and the fiber 107 in the ferrule 154. The dust cap 158 includes an attachment structure 160, which is described in more detail below.

Referring again to FIGS. 1 and 4, the deployment assembly 100 includes a sleeve 110, for example, a crimp sleeve, having a through bore 112. The sleeve 110 is sized such that the ferrule assemblies 150 of the preterminated fiber optic cables 104 and the multi fiber cable 102 can be received in the sleeve 110 and the sleeve 110 can be crimped onto an end of the multi fiber cable 102. For example, the preterminated fiber optic cables 104 can be inserted, one at a time, from a rear end of the sleeve 110 and out of a forward end of the sleeve 110 until the multi fiber cable 102 is at a position in the sleeve 110 such that the sleeve 110 can be crimped thereon.

Figure 1:
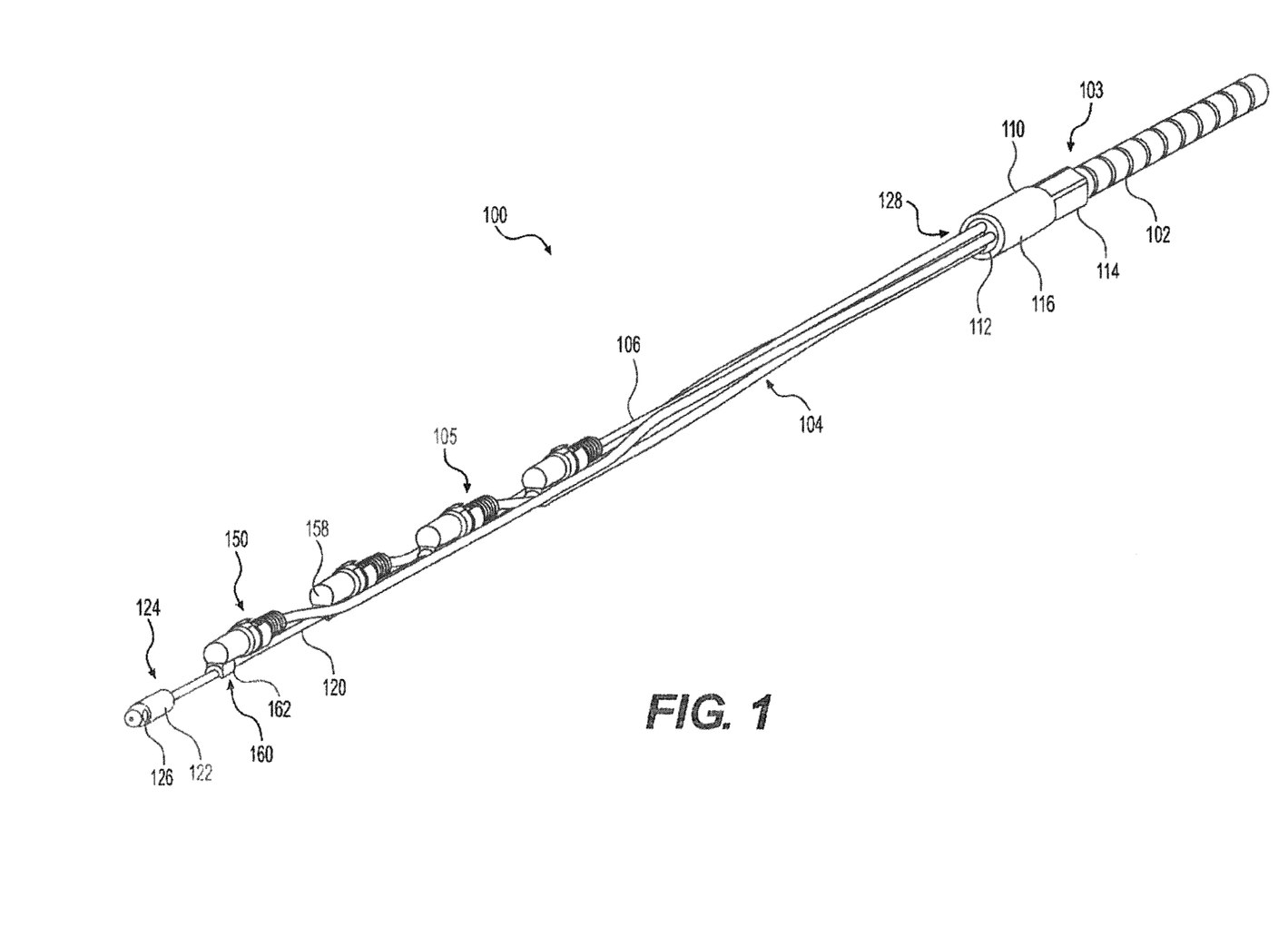
FIG. 1 is a perspective view of an exemplary deployment assembly for a multi fiber cable in accordance with various aspects of the disclosure.
Figure 2:
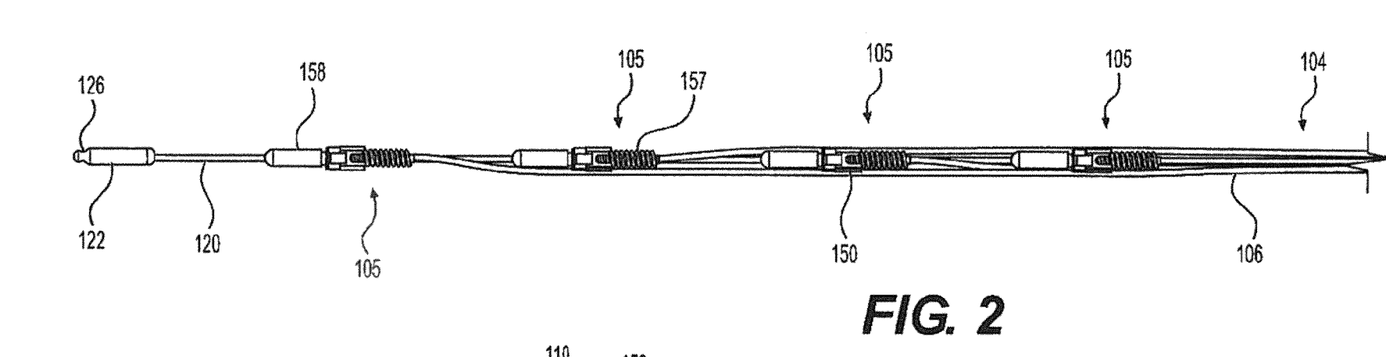
FIG. 2 is a top view of the deployment assembly for a multi fiber cable of FIG. 1.
Figure 3:
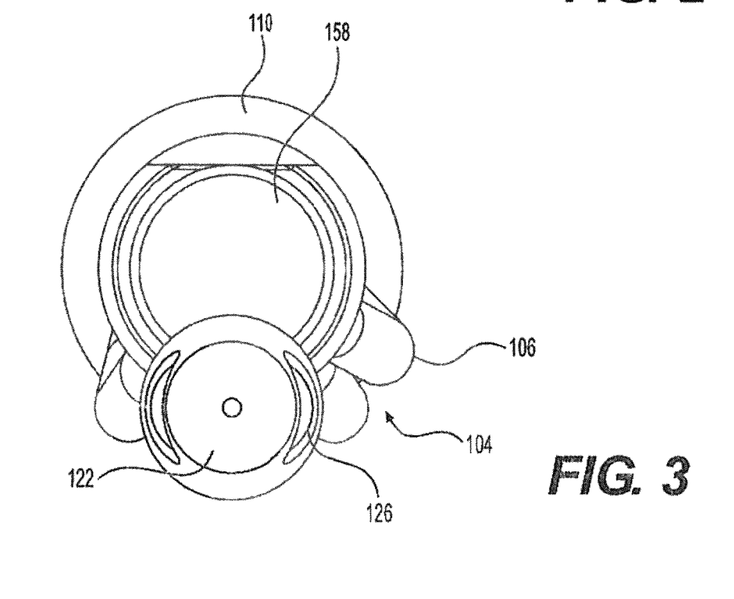
FIG. 3 is an end view of the deployment assembly for a multi fiber cable of FIG. 1.
Figure 4:
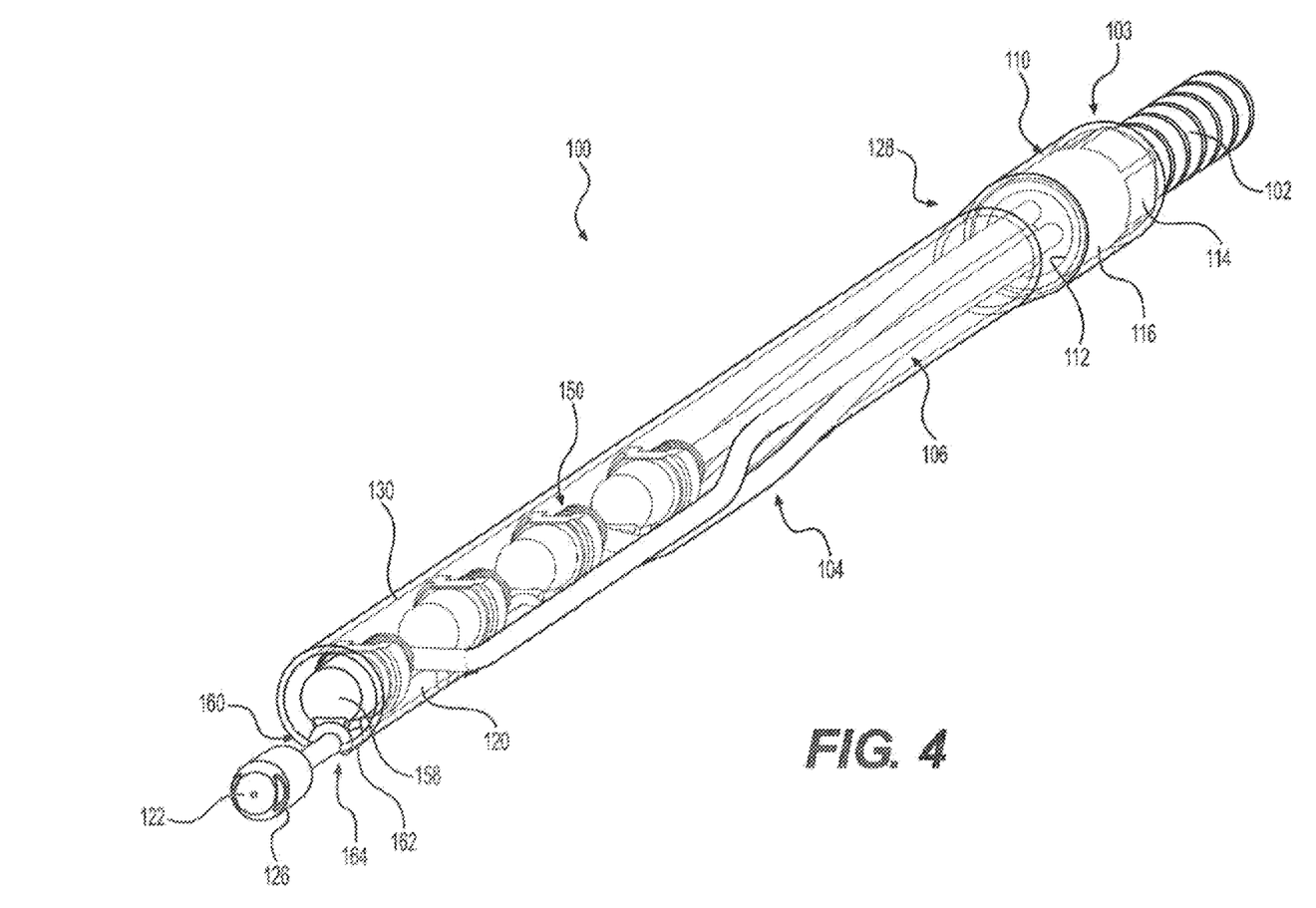
FIG. 4 is a top view of the deployment assembly for a multi fiber cable of FIG. 1 including a protective sleeve.

The deployment assembly 100 also includes a rod 120 such as, for example, a glass reinforced plastic (GRP) rod. The rod 120 may be coupled with a forward end of the sleeve 110, for example, the rod 120 may be potted inside of the sleeve 110. In some aspects, the rod 120 may include a pulling hook 122 at a first end 124 of the rod 120. The pulling hook 122 may include a through hole 126 extending in a transverse direction relative to a longitudinal dimension of the rod 120.

With the dust caps 158 on the ferrules 154, the attachment structures 160 are configured to couple the dust caps 158 and thus the preterminated ends 105 of the fiber optic cables 104 to the rod 120. For example, the attachment structure 160 may include a C-shaped projection 162 configured to snap onto the rod 120. As would be understood by persons skilled in the art, the C-shaped projection 162 has an opening 164 slightly smaller than an outside diameter of the rod 120 and is sufficiently flexible to expand to receive the rod 120 and then return toward its non-expanded configuration after it is snapped onto the rod 120.

In some aspects, the deployment assembly 110 may include a protective sleeve 130 that is configured to surround the sleeve 110, the buffer tubes 106, the ferrule assemblies 150 of the preterminated fiber optic cables 104, and/or the dust caps 158. As shown in FIG. 4, the sleeve 130 may surround at least a portion of the sleeve 110 and may extend from the sleeve 130 to a location beyond the forwardmost dust cap 158 and attachment structure 160 such that the protective sleeve is configured to protect the buffer tubes 106, the ferrule assemblies 150 of the preterminated fiber optic cables 104, the dust caps 158, and the attachment structure 160 as the deployment assembly 110 is pulled, pushed, or blown through a duct. In some aspects, the protective sleeve 130 may comprise, for example, a Polytetrafluoroethylene (PTFE) protective sleeve, which may be configured to reduce friction between the duct and the deployment assembly 110 during the pulling, pushing, or blowing.

The preterminated ends 105 of the fiber optic cables 104 of the multi fiber cable 102 are configured to be fed through the sleeve 110. The sleeve 110 is configured to be the slid over an end 103 of the multi fiber cable 102, and an inner sleeve portion 114 of the sleeve 110 is configured to be crimped onto the end 103 of the multi fiber cable 102. A second end 128 of the rod 120 is configured to be inserted into an outer sleeve portion 116 of the sleeve 110, and the fiber optic cables 104 and the rod 120 may be potted in the outer sleeve portion 116 of the sleeve 110.

In some aspects, the preterminated ends 105 of the fiber optic cables 104 of the multi fiber cable 102 may be fed through the sleeve 110 with the dust caps 158 on the ferrules 154. In some aspects, the preterminated ends 105 of the fiber optic cables 104 of the multi fiber cable 102 may be fed through the sleeve 110 without the dust caps 158, and the dust caps 158 are slid on the ferrules 154 after the fiber optic cables 104 are fed through the sleeve 110.

With the dust caps 158 on the ferrules 154, the attachment structures 160 are configured to couple the dust caps 158 and thus the preterminated ends 105 of the fiber optic cables 104 to the rod 120. For example, the attachment structure 160 may include a C-shaped projection 162 configured to snap onto the rod 120. As would be understood by persons skilled in the art, the C-shaped projection 162 has an opening 164 slightly smaller than an outside diameter of the rod 120 and is sufficiently flexible to expand to receive the rod 120 and then return toward its non-expanded configuration after it is snapped onto the rod 120.

As illustrated, the rod 120 has a length that is greater than a length of the longest buffer tube 106 that extends from the multi fiber cable 102. Lengths of the buffer tubes 106 of the fiber optic cables 104 that extend from the multi fiber cable 102 are different so that the attachment structures 160 can be spaced along a length of the rod 120 without bending or buckling the fiber optic cables 104 beyond a minimum bend radius. It should be appreciated that the rod 120 is configured to be sufficiently rigid to be pushed, pulled, or blown through a duct and sufficiently flexible to navigate turns in the duct.

In a case where the deployment assembly 150 is to be pulled through a duct, an installer can insert a hook or any other coupling arrangement (not shown) through the through hole 126 of the pulling hook 122 at the first end 124 of the rod 120. The hook or other coupling arrangement is coupled with a pulling mechanism, which can be used to pull the deployment assembly 150, and thus the fiber optic cables 104 through the duct. Alternatively, the deployment assembly 150 may be pushed or blow through the duct, as would be understood by persons skilled in the art.

After the fiber optic cables 104 are deployed to a desired location, the rod 120 can be removed from the sleeve 110. In some embodiments, the sleeve 110 may also be removed from the multi fiber cable 102 and slid over the preterminated ends 105 of the fiber optic cables 104 with or without the dust caps 158 on the ferrules 154.

Referring now to FIGS. 5-9, an exemplary field assembled fiber optic connector 195 is illustrated and described. Once the fiber optic cables 104 are deployed to a desired location, each of the preterminated ends 105 of the fiber optic cables 104 can be coupled with a body 170, a housing 180, and a boot 190 to form the connector 195, for example, an LC connector.

Figure 7:
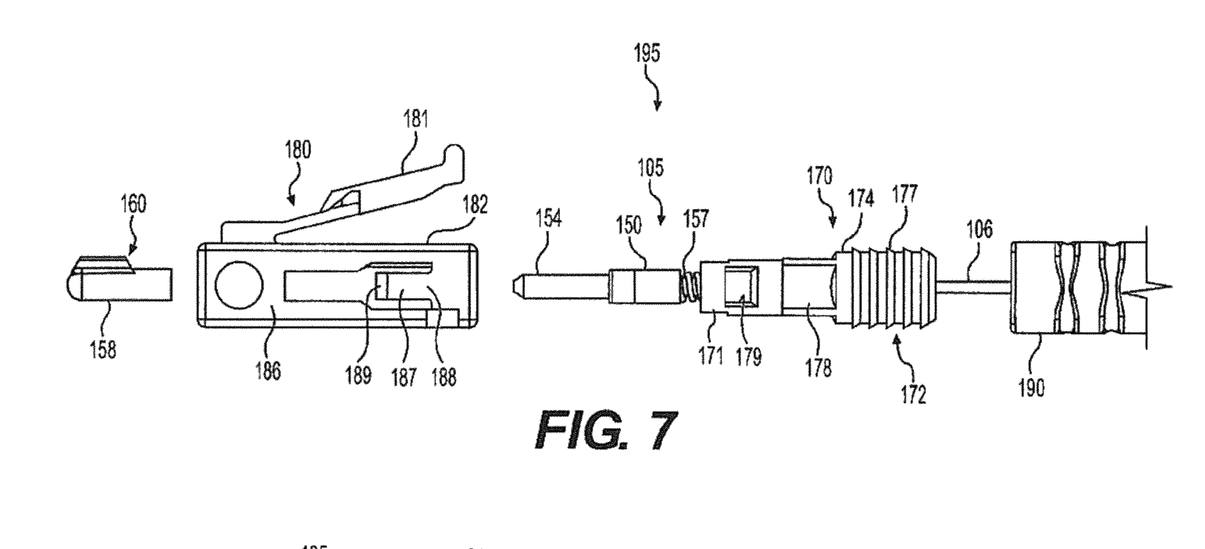
FIG. 7 is a side view of the exemplary field assembled fiber optic connector of FIG. 5 during assembly.
Figure 8:
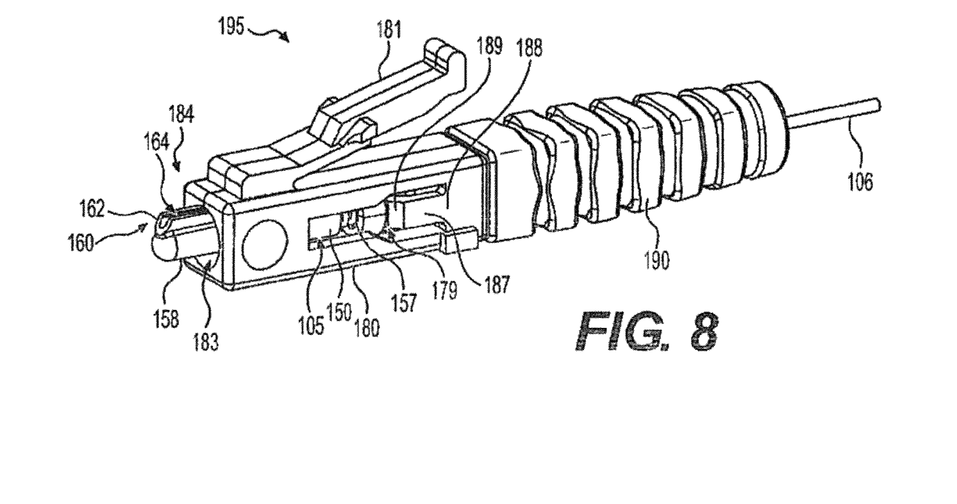
FIG. 8 is a perspective view of the exemplary field assembled fiber optic connector of FIG. 5.
Figure 9:
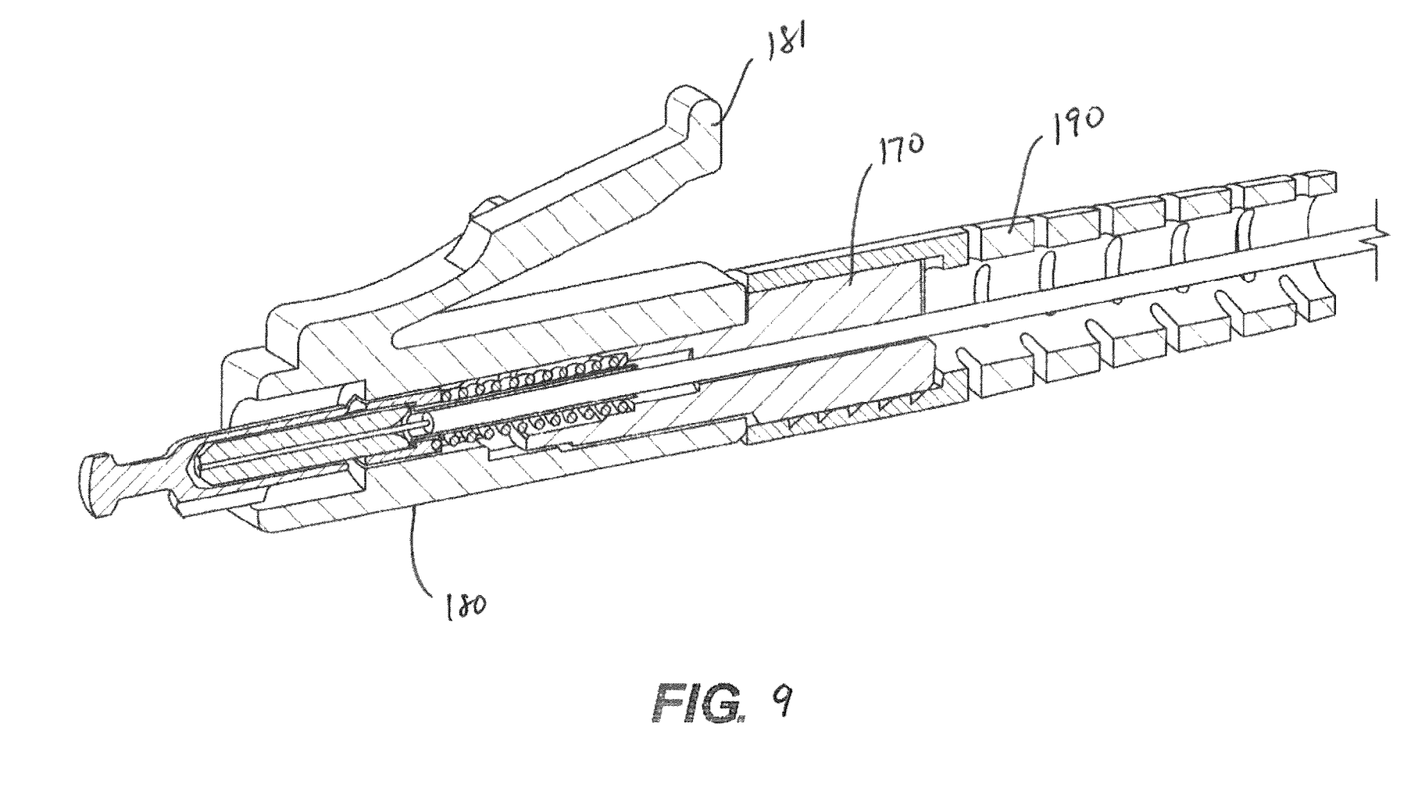
FIG. 9 is a cross-sectional view of the exemplary field assembled fiber optic connector of FIG. 5.

As shown in FIGS. 5-7 and 12, the body 170 includes a substantially cylindrical forward end portion 171, a rearward end portion 172, a substantially square middle portion 178 between the forward end portion 171 and the rearward end portion 172, and a radial slot 173 that extends from a top 174 of the body 170 to a center 175 of the body along the full length of the body 170 from the forward end portion 171 to the rearward end portion 172. The radial slot 173 is sized to receive the buffer tube 106 and permit the buffer tube 106 to be disposed at the center 175 of the body 170. The forward end portion 171 includes a bore 176 having a circular cross section with a diameter that is greater than a dimension of the radial slot 173 in a direction perpendicular to the radial direction from the top 174 to the center 175 of the body 170 and perpendicular to the longitudinal dimension of the body 170. The bore 176 includes a first portion 176' sized to slidingly receive the spring 156 and the rear stem portion 155 surrounded by the spring 156 and a second portion 176" having a smaller inside diameter than the first portion 176' so as to define a forward facing shoulder 176a. A rear end of the spring 156 is configured to engage the shoulder 176a, as shown in FIG. 9. The bore 176 may include a third portion 176''' having a larger inside diameter than the first portion 176' and being configured to guide the spring 156 into the first portion 176' of the bore 176. As shown in FIGS. 5-7, an outer surface of the forward end portion 171 includes two notches 179 on opposite lateral sides of the forward end portion 171. The rearward end portion 172 includes a barbed outer surface 177 configured to receive the boot 190 thereon. The boot 190 is configured to provide strain relief for the cable fiber optic cable 105 and a weather resistant seal at the rearward end of the connector 195.

Figures 11, 12:
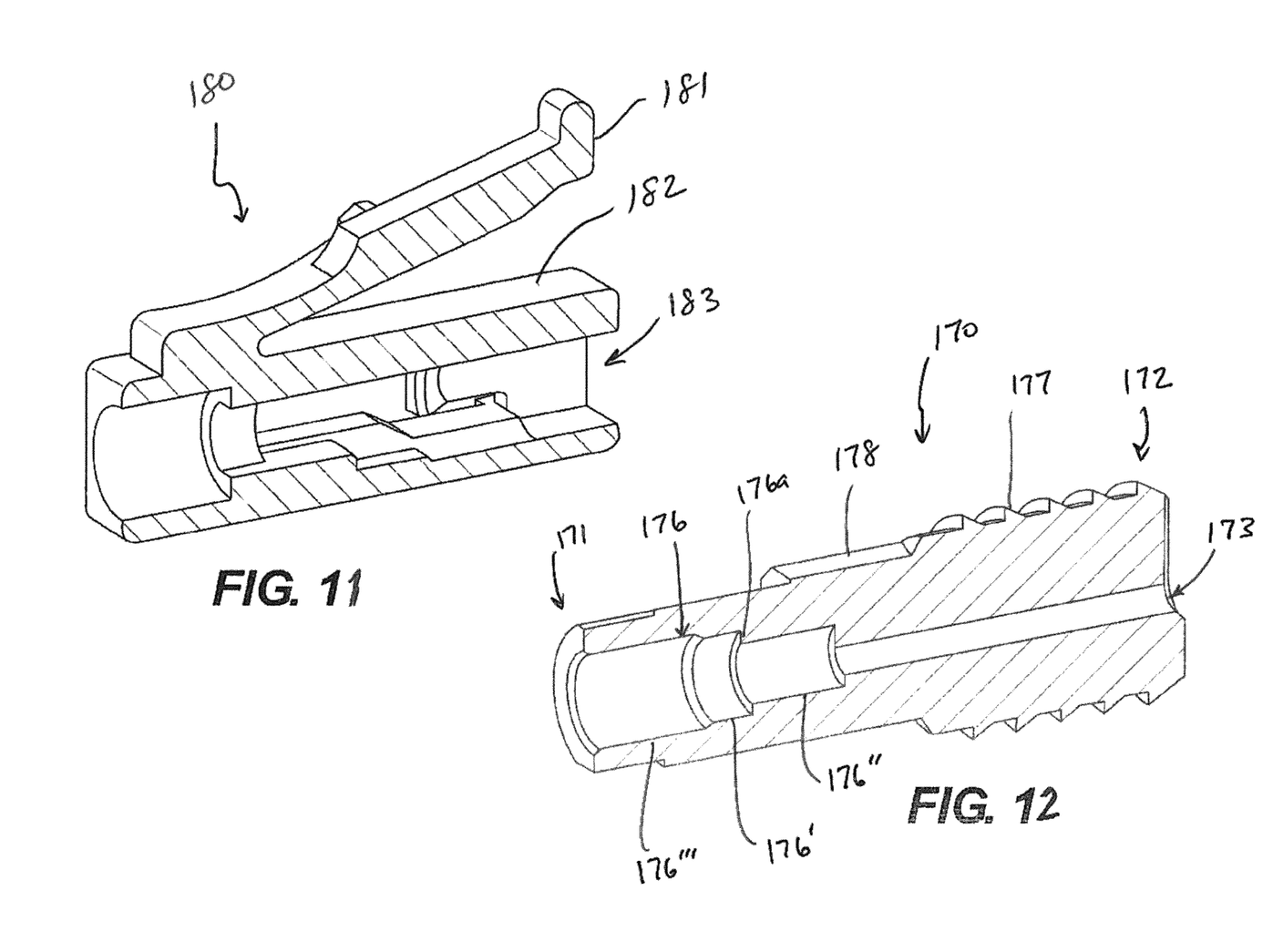
FIG. 11 is a cross-sectional view of the housing of the field assembled fiber optic connector of FIG. 5.
FIG. 12 is a cross-sectional view of the body of the field assembled fiber optic connector of FIG. 5.
Figure 13:
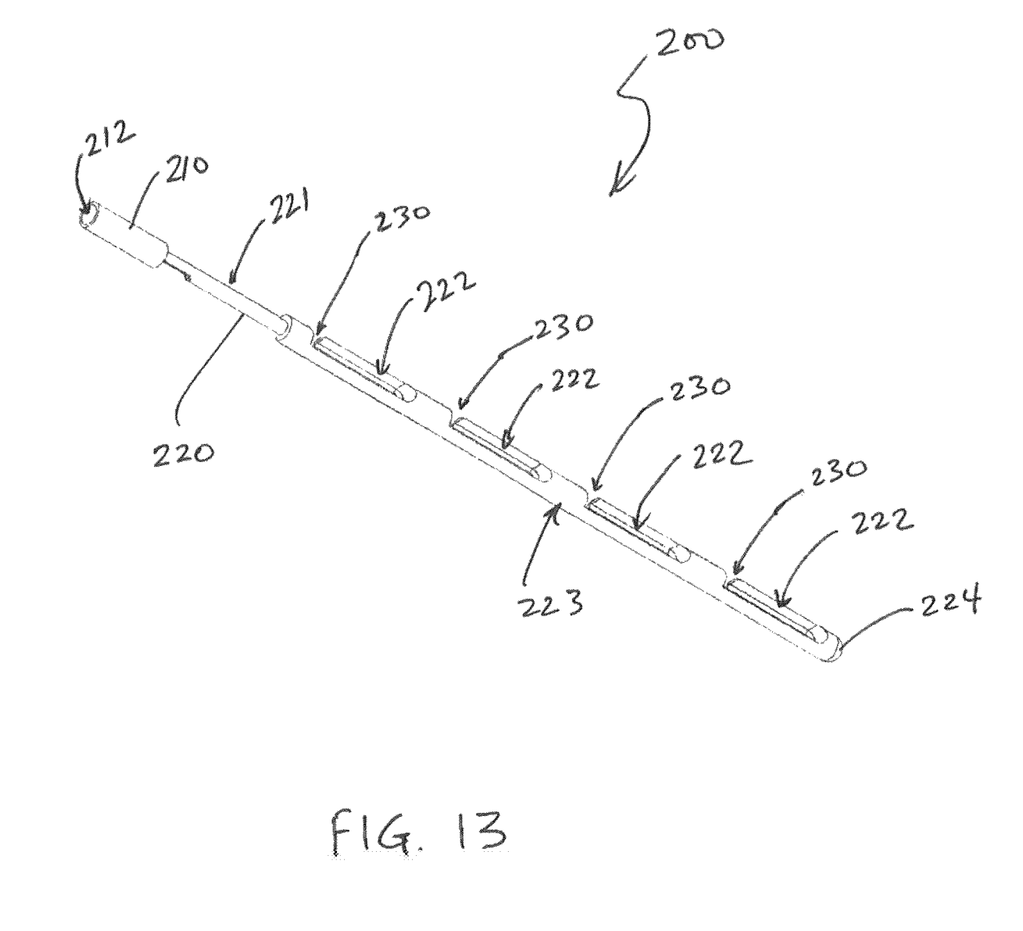
FIG. 13 is a first perspective view of another exemplary deployment assembly for a multi fiber cable in accordance with various aspects of the disclosure.

The housing 180, for example, an LC housing, is configured in a substantially square shape with a release lever 181 projecting outward from a top wall 182 of the housing 180, as is typical with conventional LC connectors. As shown in FIGS. 9 and 11, the housing 180 includes a through bore 183 configured to receive the ferrule assembly 150 and the body 170 such that the ferrule 154 can be exposed at a front end 184 of the housing 180. An inner surface of the top wall 182 of the housing 180 includes an alignment rib 185. The alignment rib 185 is configured to be received by the radial slot 173 in the top wall of the body 170 and extending the length of the body 170. The substantially square shape of the inner walls of the housing 180 and the substantially square middle portion 178 of the body also facilitate alignment of the housing 180 with the body 170. These alignment features also prevent relative rotation between the body 170 and the housing 180. Meanwhile, the two flattened regions 151 on the outer surface of the ferrule holder 152 cooperate with complementary interior surfaces 184' of the housing 180 to facilitate alignment of the housing 180 with the ferrule assembly 150 and prevent relative rotation between the ferrule assembly 150 and the housing 180.

The housing 180 further includes side walls 186 having resilient fingers 187 extending inward into the through bore 183. Each of the resilient fingers 187 is cantilevered at its rear end 188, and the free forward end 189 of each finger 187 is configured to engage one of the notches 179 in the outer surface on opposite lateral sides of the forward end portion 171 when the body 170 is inserted into the housing 180 to couple the housing 180 with the ferrule assembly 150.

To field assemble the connector 195, the boot 190 is configured to be slid over one of the deployed ferrule assemblies 150 and the fiber optic cable 104 preterminated by the ferrule assembly 150. The fiber optic cable 104 is configured to be inserted into the radial slot 173 of the body 170. In some aspects, the ferrule assembly 150 is configured to be inserted into the housing 180 using the two flattened regions 151 on the outer surface of the ferrule holder 152 and complementary interior surfaces 184' of the housing 180 to facilitate alignment of the housing 180 with the ferrule assembly 150. The body 170 configured to be slid axially in a direction toward the ferrule 154. The forward facing shoulder 176a of the body 170 is configured to engage and compress the spring 156. The body 170 is configured to be slid further in the axial direction using the alignment rib 185 and the radial slot 173 for alignment until the free forward ends 189 of the resilient fingers 187 of the housing 180 engage the notches 179 in the outer surface of the forward end portion 171 of the body 170 to secure the body 170 and ferrule assembly 150 to the housing 180. The dust cap 158 needs to be removed from the ferrule 154 before the ferrule assembly 150 is inserted into the housing 180 and should be placed back on the ferrule 154 after the body 170 and ferrule assembly 150 are secured to the housing 180.

In another aspect, after the fiber optic cable 104 is inserted into the radial slot 173 of the body 170, the body 170 can be slid in a direction toward the ferrule 154 until a forward facing shoulder of the body 170 engages and compresses the spring 156. The body 170 and the ferrule assembly 150 are configured to be slid further in the axial direction using the alignment rib 185 and the radial slot 173 for alignment until the free forward ends 189 of the resilient fingers 187 of the housing 180 engage the notches 179 in the outer surface of the forward end portion 171 of the body 170 to secure the body 170 and ferrule assembly 150 to the housing 180.

Thus, the deployment assembly 100 is configured to be coupled with a plurality of preterminated fiber optic cables and to provide a cross-sectional footprint that is smaller than a cross-sectional footprint of a fiber optic connector that is configured to be assembled with the preterminated fiber optic cable such that the plurality of fiber optic cables can be easily and smoothly pushed, pulled, or blown together through a duct having an inner diameter than is less than a footprint the fiber optic connector. The fiber optic connector is configured to be field assembled with the plurality of preterminated fiber optic cables after the plurality of fiber optic cables are pushed, pulled, or blown together through a duct and the deployment assembly is removed from the plurality of preterminated fiber optic cables.

It should be appreciated that in some embodiments, the rod 120 can include an attachment structure similar to the attachment structure 160 described above, and the dust cap 158 can be replaced with a cylindrical dust cap with no attachment structure. In such embodiments, the attachment structure of the rod can clip onto the cylindrical dust cap.

Referring now to FIGS. 13-16, an alternative deployment assembly 200 for pushing, pulling, and/or blowing multiple preterminated fiber optic cables of a multi fiber cable through a duct. The deployment assembly 200 includes a sleeve 210, for example, a crimp sleeve, having a through bore 212. The sleeve 210 is sized such that the ferrule assemblies 150 of the preterminated fiber optic cables 104 and the multi fiber cable 102 can be received in the sleeve 210 and the sleeve 210 can be crimped onto an end of the multi fiber cable 102. For example, the preterminated fiber optic cables 104 can be inserted, one at a time, from a rear end of the sleeve 210 and out of a forward end of the sleeve 210 until the multi fiber cable 102 is at a position in the sleeve 210 such that the sleeve 210 can be crimped thereon.

The deployment assembly 200 also includes a rod 220 such as, for example, a glass reinforced plastic (GRP) rod. The rod 220 extends from a forward end of the sleeve 210 to an end portion 224. The rod 220 may include a first portion 221 configured to extend from the sleeve 210 and a second portion 223 configured to extend from the first portion 221 to the end portion 224. The fiber optic cables 104 may be potted inside of the sleeve 210. In some aspects, the rod 220 may include a pulling hook at the end portion 224 similar to the pulling hook 122 described above.

The second portion 223 of the rod 220 includes a plurality of cutouts 222, each configured to receive a ferrule assembly 150 of one of the preterminated fiber optic cables 104. The second portion 223 and the end portion 224 of the rod 220 comprise an outer diameter configured to be pulled, pushed, or blown through a duct. The cutouts 222 are configured to receive the ferrule assemblies 150 such that that ferrule assemblies 150 do not extend radially beyond the outer diameter of the second portion 223 of the rod 220.

Figure 14:
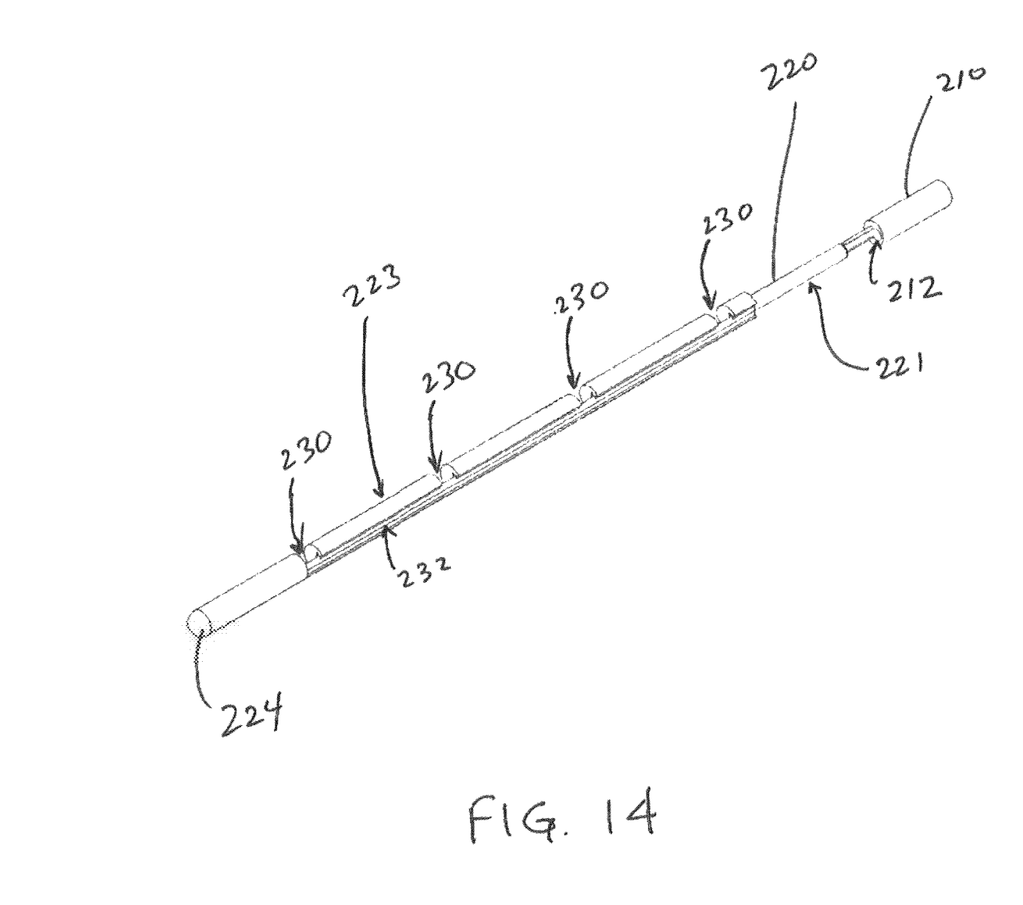
FIG. 14 is a second perspective view of the deployment assembly for a multi fiber cable of FIG. 13.
Figure 15:
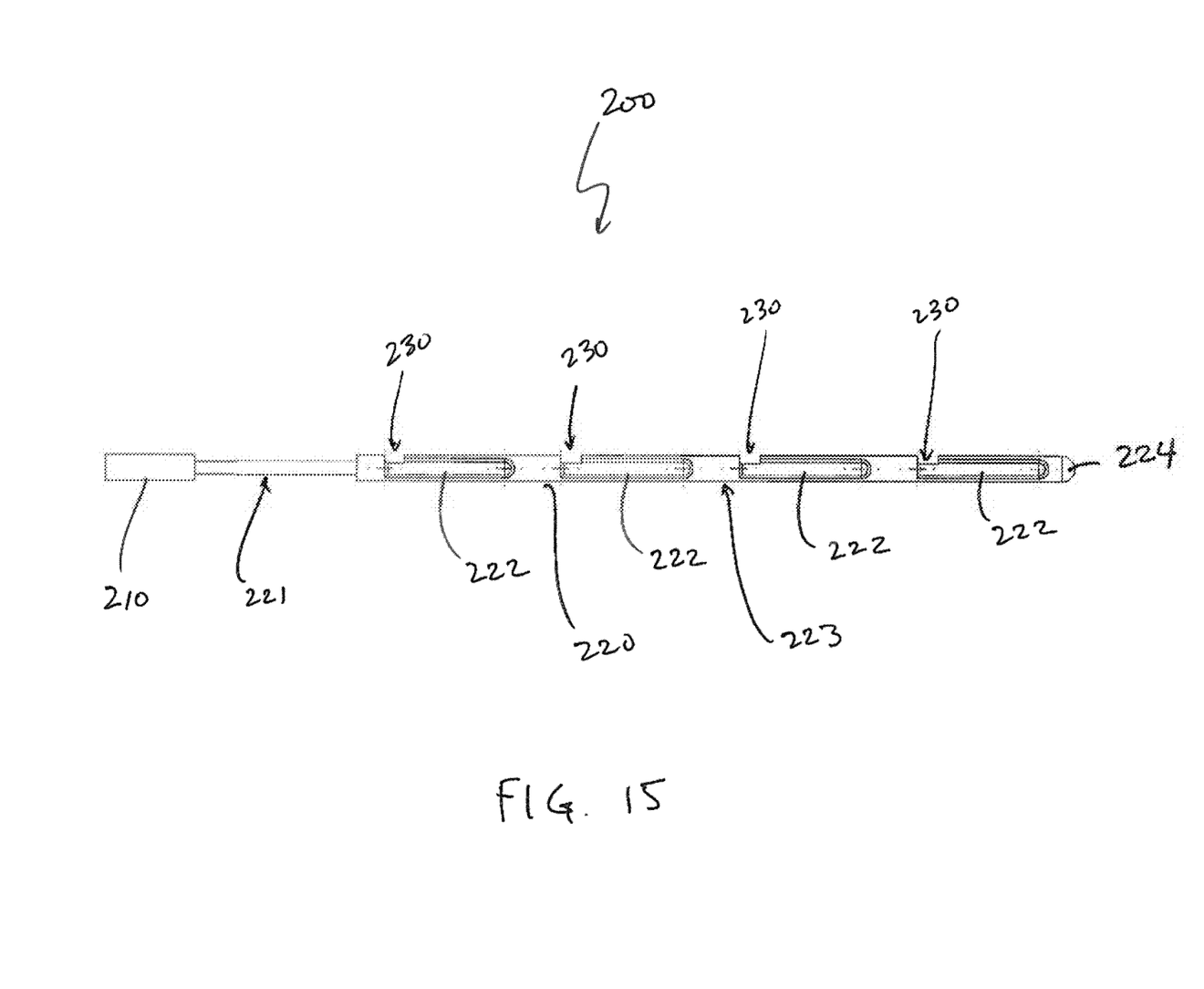
FIG. 15 is a first side view of the deployment assembly for a multi fiber cable of FIG. 13.
Figure 16:
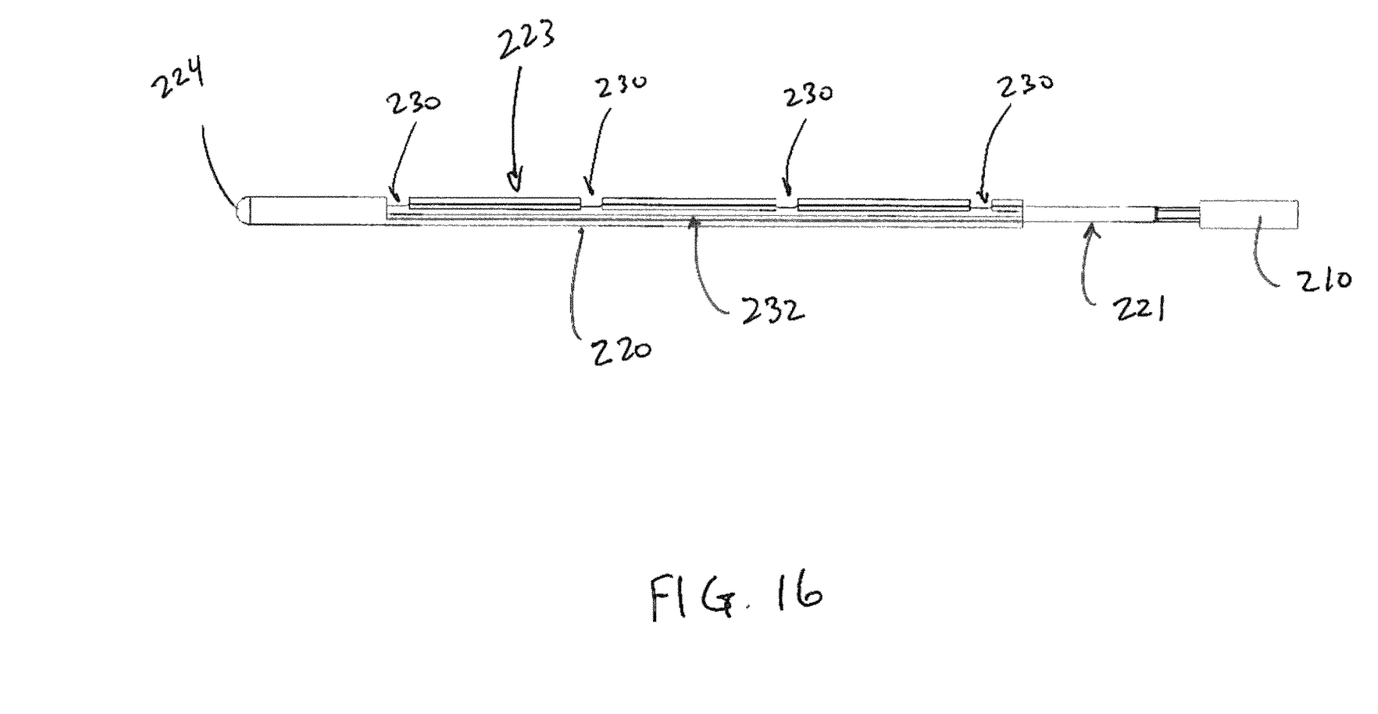
FIG. 16 is a second side view of the deployment assembly for a multi fiber cable of FIG. 13.

As best shown in FIGS. 14 and 16, the second portion 223 may include a circumferential notch 230 at a rearward end of each cutout 222. The notches 230 are configured to permit the respective fiber optic cable 104 to be inserted into the respective notch 230 and routed to a longitudinal channel 232 configured to extend to the sleeve 210 such that the fiber optic cables 104 do not extend radially beyond the outer diameter of the second portion 223 of the rod 220.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A device for pulling, pushing, or blowing a plurality of preterminated fiber optic cables of a multi fiber cable through a duct having a cross-sectional footprint smaller than a cross-sectional footprint of a fiber optic connectors configured to be connected to the plurality of preterminated fiber optic cables, comprising:
   a sleeve portion configured to receive a multi fiber cable and to permit a plurality of preterminated fiber optic cables of the multi fiber cable to pass through the sleeve;

a rod portion configured to extend from the sleeve portion and to be coupled with cover portions that are each configured to cover a preterminated end portion of one of a plurality of preterminated fiber optic cables; and wherein the deployment device has a cross-sectional footprint that is smaller than a cross-sectional footprint of a fiber optic connector that is configured to be assembled with the preterminated fiber optic cable such that the plurality of preterminated fiber optic cables are configured to be pushed, pulled, or blown together through a duct having an inner diameter than is less than a cross-sectional footprint of a fiber optic connector that is configured to be assembled with the preterminated fiber optic cable.

2. The device of claim 1, further comprising a fiber optic connector configured to be field assembled with one of the plurality of preterminated fiber optic cables after the plurality of fiber optic cables are pushed, pulled, or blown together through a duct and the deployment device is removed from the plurality of preterminated fiber optic cables.

3. The device of claim 1, wherein each of the cover portions is coupled with the ferrule of one of the predetermined fiber optic cables.

4. The device of claim 3, wherein each of the cover portions includes an attachment portion configured to be coupled with the rod portion so as to couple the preterminated fiber optic cables with the rod portion.

5. The device of claim 4, wherein the attachment portion comprises a clip configured to be clipped onto the rod portion.

6. The device of claim 5, wherein the clips are configured to be clipped onto the rod portion sequentially along a length of the rod portion.

7. The device of claim 6, wherein a free end of the rod portion includes a pulling hook.

8. The device of claim 1, wherein the rod portion is configured to be removed from the sleeve.

9. The device of claim 1, further comprising a protective sleeve configured to surround a portion of the sleeve portion, the rod portion, and the cover portions.

10. The device of claim 1, wherein the cover portions are configured to be coupled with the rod portion sequentially along a length of the rod portion.

11. A device for pulling, pushing, or blowing a plurality of preterminated fiber optic cables of a multi fiber cable through a duct having a cross-sectional footprint smaller than a cross-sectional footprint of a fiber optic connectors configured to be connected to the plurality of preterminated fiber optic cables, comprising:

a receiving portion configured to receive a multi fiber cable and to permit a plurality of preterminated fiber optic cables of the multi fiber cable to pass through the sleeve;

an extension portion configured to extend from the sleeve portion and to be coupled with a preterminated end portion of each of a plurality of preterminated fiber optic cables; and wherein the deployment device has a cross-sectional footprint that is smaller than a cross-sectional footprint of a fiber optic connector that is configured to be assembled with the preterminated fiber optic cable such that the plurality of preterminated fiber optic cables are configured to be pushed, pulled, or blown together through a duct having an inner diameter than is less than a cross-sectional footprint of a fiber optic connector that is configured to be assembled with the preterminated fiber optic cable.

12. The device of claim 11, wherein the preterminated end portions are configured to be coupled with the extension portion sequentially along a length of the extension portion.

13. The device of claim 11, further comprising a fiber optic connector configured to be field assembled with the plurality of preterminated fiber optic cables after the plurality of fiber optic cables are pushed, pulled, or blown together through a duct and the deployment device is removed from the plurality of preterminated fiber optic cables.

14. The device of claim 11, further comprising cover portions, wherein each of the cover portions is structurally configured to cover a preterminated end portion of one of the plurality of preterminated fiber optic cables.

15. The device of claim 14, wherein the cover portions are configured to be coupled with the extension portion sequentially along a length of the extension portion.

16. The device of claim 14, wherein each of the cover portions is structurally configured to be coupled with the ferrule of one of the predetermined fiber optic cables.

17. The device of claim 16, wherein each of the cover portions includes an attachment portion configured to be coupled with the extension portion, thereby coupling the preterminated fiber optic cables with the extension portion.

18. The device of claim 17, wherein the attachment portion comprises a clip configured to be clipped onto the extension portion.

19. The device of claim 18, wherein the clips are configured to be clipped onto the extension portion sequentially along a length of the extension portion.

20. The device of claim 19, wherein a free end of the extension portion includes a pulling hook.

21. The device of claim 11, wherein the rod portion is configured to be removed from the receiving portion.

22. The device of claim 11, further comprising a protective sleeve configured to surround a portion of the receiving portion, the extension portion, and the cover portions.

* * * * *